Nov. 17, 1936.  L. E. LA BRIE  2,060,876
BRAKE
Filed March 18, 1933  2 Sheets-Sheet 1
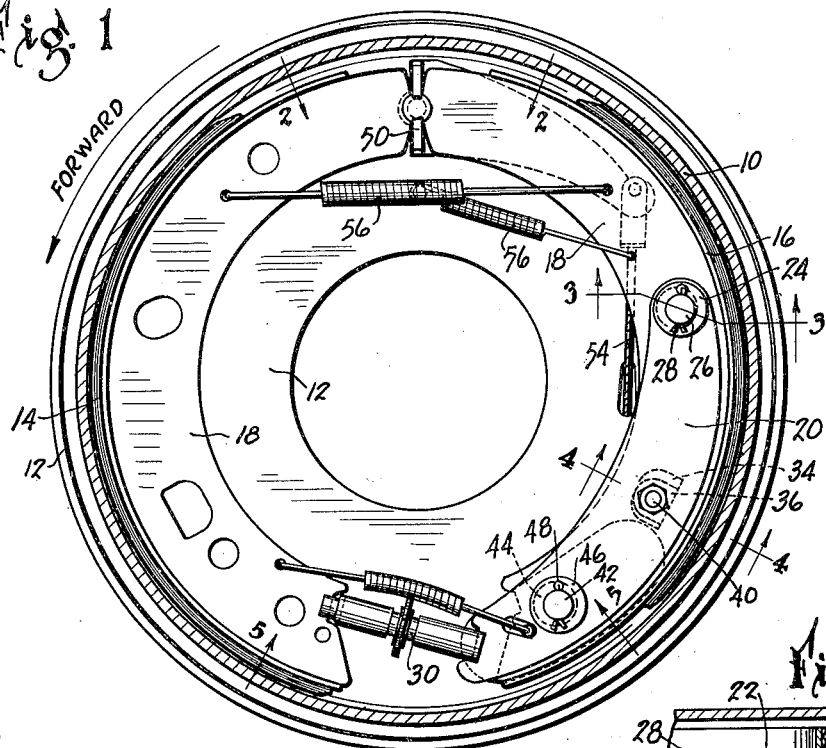
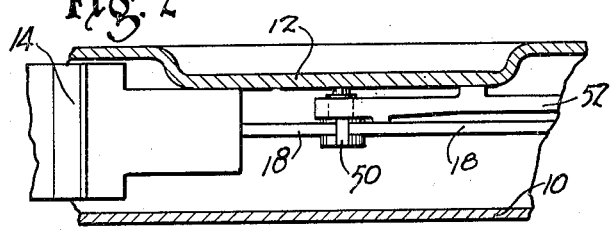
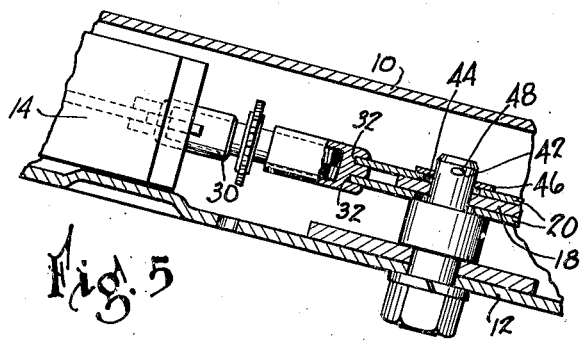
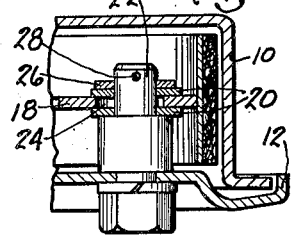
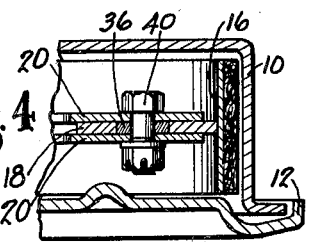
INVENTOR.
Ludger E. LaBrie
BY
ATTORNEY.

Nov. 17, 1936.   L. E. LA BRIE   2,060,876
BRAKE
Filed March 18, 1933   2 Sheets-Sheet 2

INVENTOR.
*Ludger E. LaBrie*
BY
ATTORNEY.

Patented Nov. 17, 1936

2,060,876

UNITED STATES PATENT OFFICE 2,060,876

BRAKE

Ludger E. La Brie, South Bend, Ind., assignor to Bendix Aviation Corporation, South Bend, Ind., a corporation of Delaware Application March 18, 1933, Serial No. 661,614

21 Claims. (Cl. 188—78)

This invention relates to brakes, and is illustrated as embodied in a "servo" or "self-energizing" type of brake. An important object of the invention is to improve the application of the "servo" or "self-energizing" action obtained when one of the shoes is engaged with the drum, and at the same time to increase the controllability.

One feature of the invention relates to the design and arrangement of a novel power-multiplying means between the shoes, illustrated as an arcuate thrust member or anchor link receiving the thrust of one of the brake shoes and forcing another of the brake shoes against the drum, and which is preferably arranged alongside said other shoe. This provides a "servo" brake construction lying wholly within the zone adjacent the periphery of the drum. I prefer to anchor the first or "servo" shoe on the above-described thrust link, and to provide a separate anchorage for the other shoe on which the link acts.

Another object of the invention is to provide a brake of the type referred to which is economical to manufacture, having few parts. The above and other objects and features of the invention, including various novel combinations of parts and desirable particular constructions, will appear more fully hereinafter from the following detailed description when taken in connection with the accompanying drawings. It is to be expressly understood, however, that the drawings are for purposes of illustration only and are not to be taken as a definition of the limits of the invention, reference being had for this purpose to the appended claims.

In the drawings, wherein like reference characters refer to like parts throughout the several views:

Figure 1 is a vertical section through the brake, just inside the head of the drum, showing the shoes in side elevation;

Figure 2 is a sectional view of the brake actuator taken in the direction of the arrows 2 in Figure 1;

Figure 3 is a section on the line 3—3 of Figure 1 showing the anchoring of the arcuate members to the backing plate;

Figure 4 is a section on the line 4—4 of Figure 1 showing the connection between the arcuate members and the web of a brake shoe;

Figure 5 is a sectional view of the brake taken in the direction of the arrows 5 showing the anchoring of a brake shoe to the backing plate and the adjusting screw connection between the arcuate members and the end of the unanchored shoe;

Figure 6:
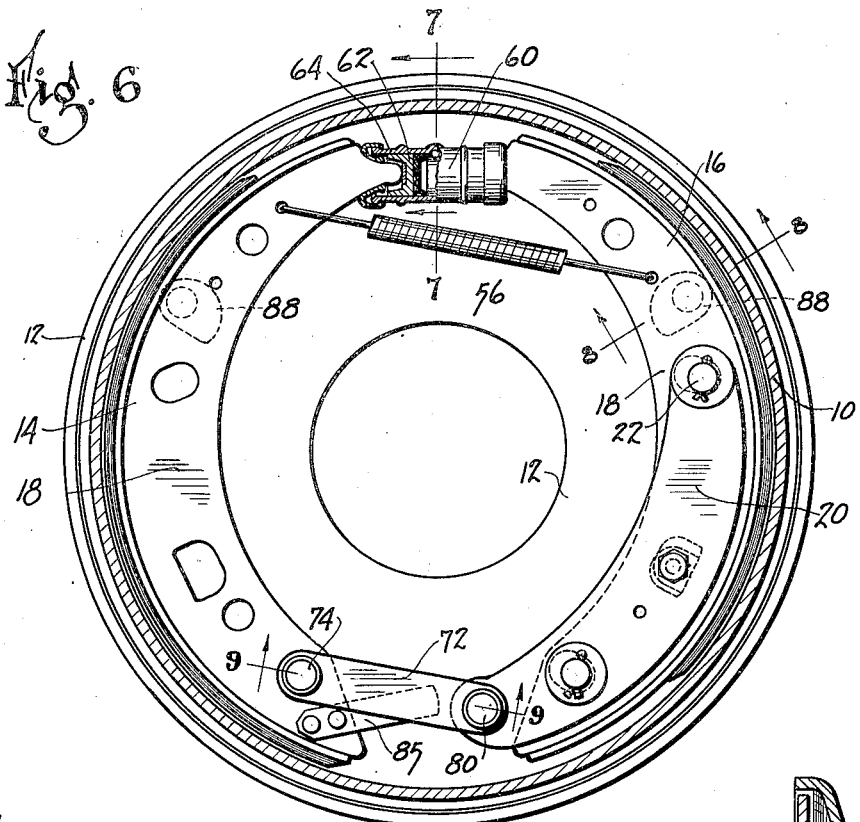
Figure 6 is a vertical section through a hydraulic brake just inside the head of the drum showing the shoes in side elevation.

One form of the illustrated brakes includes a drum 10, at the open side of which there may be arranged a suitable support such as a backing plate 12, forming a substantially closed brake chamber within which is arranged the brake-retarding means, which in this disclosure takes the form of a pair of arcuate T-section shoes 14 and 16.

The above described shoes are arranged to form a brake of the "servo" or "self-energizing" type when the drum is rotating in a forward or counterclockwise direction, the shoe 14 applying the shoe 16 against the drum. In the event the drum is rotating backwardly or in a clockwise direction, the shoes are independent. The invention, however, is not limited to such an arrangement, but can be applied to other types of brakes where "servo" action is desired.

According to an important feature of the invention, the shoe 16 is forced against the drum by novel power-multiplying means comprising arcuate members such as thrust anchor links 20 extending along opposite sides of the web 18 of the shoe 16. The arcuate members 20 are pivoted at their upper ends on a support or anchor post 22 which is attached to the backing plate 12 in the manner shown in Figure 3. A large hole 24 is provided in the web 18 of the shoe 16 as shown in the dotted lines in Figure 1 in order to permit movement of the web 18 between the arcuate members 20 at this point. The arcuate members 20 are maintained on the support 22 by a washer 26 and a cotter pin 28.

The lower ends of the arcuate members 20 receive the thrust of the shoe 14, when the latter is engaged with the forwardly rotating drum 10, through the medium of a floating connection such as an adjusting screw 30 having right and left threaded ends. As disclosed in Figure 5, seats 32 in the adjusting screw 30 receive the lower ends of the arcuate members 20. At about midway between their ends, the arcuate members 20 are connected to the web of the shoe, preferably in the manner illustrated in Figures 1 and 4. A large rectangular hole 34, shown in dotted lines in Figure 1, is provided in the web 18 in order to receive a bearing block 36, also shown in dotted lines in Figure 1, which is fixed to the arcuate members 20 by a bolt 40.

Brake shoe 14 is a floating shoe, having no connection with any stationary part of the brake, such as the backing plate 12, whereas brake shoe 16 is anchored by pivoting the lower end of the shoe on an anchor post 42 attached to the backing plate 12. Figure 5 illustrates the manner of anchoring the shoe and shows the provision of large holes 44 in the arcuate members 20 in order to permit them to move relatively to the anchor 42. A washer 46 and a cotter pin 48 maintain the members 20 and the shoe 16 on the anchor.

The brake shoes may be applied to the drum by means such as a double cam 50 formed on a lever 52 actuated by a cable 54 passing through the backing plate and forming part of a Bowden control connected to a brake pedal (not shown). Actuation of the cam 50 forces the shoes 14 and 16 toward the drum against the resistance of the return springs 56.

When the car is moving forwardly, at which time the drum 10 will rotate in a counterclockwise direction, shoe 14, engaging with the drum, turns with the drum and thrust against the arcuate members 20 through the medium of the adjusting screw 30 and thereby acts as a "servo" shoe on the anchored shoe 16. Owing to the fact that the arcuate members 20 act between their ends on the shoe 16 and receive the thrust of the shoe 14 at their lower ends, a novel power-multiplying means is provided for tansmitting the thrust of the shoe 14. This thrusting action is supplementary to the normal brake application of the cam 50 and, as a result, shoe 16 is applied against the forwardly rotating drum with increased effectiveness by two brake actuators.

Figure 7:
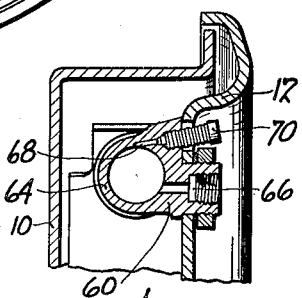
Figure 7 is a section on the line 7—7 in Figure 6 showing the hydraulic brake actuator.

Figures 6, 7, 8 and 9 illustrate the application of this invention to a hydraulic brake. The brake shoes 14 and 16 having webs 18 are arranged within the drum 10 similarly to the modification for mechanical brakes previously disclosed. A hydraulic brake actuator 60 containing pistons 62 reciprocating within the cylinder 64 applies the shoes 14 and 16 against the drum. In Figure 7, there is shown a conduit 66 for injecting fluid under pressure into the cylinder 64. An outlet 68 closed by the adjustable bleed valve 70 permits access to the brake cylinder 64. As previously disclosed in the mechanical brake modification, arcuate members 20 on either side of the web 18 are pivoted on support 22 attached to the backing plate 12 and are connected between their ends at 40 to the web 18 of the shoe 16. The lower ends of the members 20 are connected to links 72 which receive the thrust of the shoe 14 when it is engaged with the drum.

Figure 9:
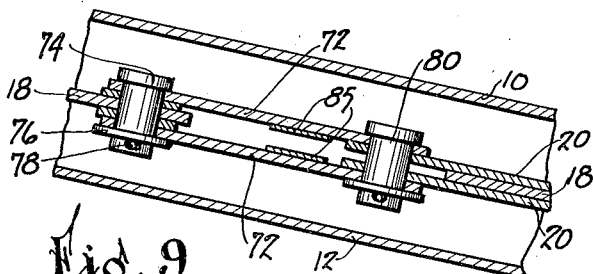
Figure 9 is a section through the line 9—9 in Figure 6 showing the connecting link between the unanchored shoe and the arcuate power-multiplying means.

Links 72 are connected, as shown in Figure 9, to the shoe 14 by a bolt 74 and are held in place by a washer 76 and a cotter pin 78. Likewise, at their other ends, the links 72 are connected to the arcuate members or thrust anchor links 20 by the bolt 80 and held in place by a washer 82 and a cotter pin 84. Leaf springs 85 frictionally hold links 72 to prevent their shifting with respect to the shoe except under load.

Figure 8:
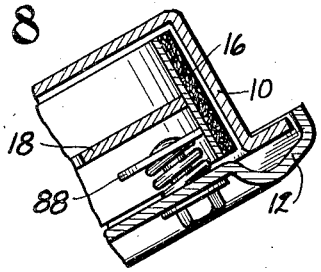
Figure 8 is a section on the line 8—8 in Figure 6.

Ajustable cams 88 attached to the backing plate 12 in the manner disclosed in Figure 8 are placed in the rear of the shoes 14 and 16 in order to prevent their being withdrawn too far from the drum by the return spring 56. The operation of this modification resembles the operation of the mechanical brake disclosed in the previous modification except that the shoes are applied against the drum by hydraulic means.

While two forms of the invention have been illustrated and described, it is not my intention to limit its scope thereto, or otherwise than by the terms of the appended claims.

I claim:

1. A brake comprising, in combination, a drum, a pair of shoes engageable with the drum, a web on said shoes extending radially inward, a connecting means between said shoes including a pivoted link beside the web of one shoe and having the same general shape as said web, said web and the link arranged beside it being provided one with an opening and the other with a thrust projection extending into said opening, and applying means acting on both shoes.

2. A brake comprising, in combination, a drum, an anchored shoe, an arcuate member beside the anchored shoe and acting on said shoe between its ends, and an auxiliary shoe anchored on said member and acting thereon to urge the anchored shoe into engagement with the drum and having its connection to said member arranged at the anchored end of the anchored shoe.

3. A brake comprising, in combination, a drum, a shoe anchored on a fixed pivot at one end, auxiliary applying means extending past said pivot and operatively engaging the anchored shoe and acting on said shoe between its ends, an auxiliary shoe having one end adjacent said pivot and having a part operatively engaging said auxiliary applying means and acting thereon to urge the anchored shoe into engagement with the drum, and applying means acting directly on the two shoes.

4. A brake comprising, in combination, a drum, an anchored shoe engageable with the drum, an arcuate member beside said shoe which is pivoted at one end and which has attached thereto at its other end adjacent the anchored end of the anchored shoe an auxiliary shoe, and a connection between the anchored shoe and a part of the arcuate member between its ends.

5. A brake comprising, in combination, a drum, a pair of brake shoes engageable with the drum, brake applying means at one side of the drum acting directly on said shoes for forcing the shoes against the drum, an anchor on which one of said shoes is pivoted at the end opposite the applying means, and an auxiliary brake applying means at the other side of the drum and extending past said anchor and operated by the other of the shoes and connected to the anchored shoe between its ends for forcing the latter into engagement with the drum.

6. A brake comprising, in combination, a drum, a pair of brake shoes engageable with the drum, brake applying means at one side of the drum acting directly on said shoes for forcing the shoes against the drum, an auxiliary brake applying means at the other side of the drum and extending alongside one of the shoes and operated by one of the shoes and connected to the other shoe between its ends for forcing the latter into engagement with the drum, and brake anchorage means acting directly on said other shoe and acting on said one shoe through said auxiliary means and including a fixed pivot on which one of the shoes is mounted at its end opposite the brake applying means.

7. A brake comprising, in combination, a drum, a pair of brake shoes engageable with the drum, brake applying means acting directly on said shoes and for forcing the shoes against the drum, a fixed pivot on which one of the shoes is anchored at the end opposite the brake applying means, and an auxiliary brake applying means extending past said pivot and operatively connected at its opposite ends to said shoes respectively and operated by one of the shoes for forcing the other shoe against the drum.

8. A brake comprising, in combination, a drum, a pair of brake shoes engageable with the drum, brake applying means acting directly on said shoes and for forcing the shoes against the drum, an anchor on which one of the brake applying means, at the end opposite the brake applying means, power-multiplying means extending past said pivot and connecting said shoes and through which one shoe acts to force the other against the drum.

9. A brake comprising, in combination, a drum, a pair of brake shoes engageable with the drum and at least one of which is provided with a stiffening web, brake applying means acting directly on said shoes and acting on an end of each shoe, an anchorage for the other end of one shoe, an auxiliary brake applying means attached to the other end of the other of said shoes and to a part of said one anchored shoe between its ends, said latter means lying wholly within a region adjacent the inner periphery of the drum and being arranged beside and operatively connected to said web.

10. A brake comprising, in combination, a drum, a friction device anchored at one end and engageable with the drum, an auxiliary servo shoe at the anchored end of the friction device, brake applying means for forcing against the drum the auxiliary shoe and the unanchored end of the friction device, and auxiliary power-multiplying means following the curvature of the drum and connecting the auxiliary shoe with a part of the friction device between its ends.

11. A brake comprising, in combination, a drum, a friction device anchored at one end and engageable with the drum, an auxiliary servo shoe at the anchored end of the friction device, brake applying means for forcing against the drum the auxiliary shoe and the unanchored end of the friction device, and auxiliary power-multiplying means following the curvature of the drum and connecting the auxiliary shoe with a part of the friction device between its ends and arranged to serve as an anchor for the auxiliary shoe.

12. In a brake mechanism, the combination of a brake drum, a pair of brake shoes arranged end to end and engageable with the drum, actuating means for swinging the free ends of the shoes into engagement with the drum, one of said shoes being permitted to partake of the movement of the drum, a link alongside the other shoe and acting on a part of the other shoe between its ends and which is pivotally anchored at its end, and a floating link pivoted at its ends to the other end of said anchored link and to the said one shoe.

13. In a brake mechanism, the combination of a brake drum, a pair of brake shoes cooperating with the interior thereof, actuating means for swinging the free ends of said shoes into engagement with said drum, and power-multiplying means connecting the other end of one of said shoes with a part of the other of said shoes between its ends, and an anchorage for said one shoe on which said means is pivoted.

14. A brake comprising, in combination, a drum, a pair of brake shoes engageable with the drum, a support, a web on one of said shoes extending radially inward, and having on either side arcuate members following the curvature of the web, said arcuate members being anchored to the support at one end and attached at their other ends to the other one of the brake shoes, and a thrust connection between the arcuate members and the web of the first shoe.

15. A brake comprising, in combination, a drum, a stationary backing plate, a brake shoe engageable with the drum and mounted at one end on a fixed anchor pivot carried by the backing plate, a web in said shoe extending radially inward, an arcuate member extending along the side of said web between the web and the backing plate and anchored at one end to the backing plate, said arcuate member having a thrust connection between its ends with the web, and an auxiliary shoe connected to the unanchored end of said member.

16. A brake comprising, in combination, a drum, a brake shoe engageable with the drum, a web on said shoe extending radially inward, an arcuate member anchored at one end to a stationary part of the brake and adapted at its other end to receive the thrust of an auxiliary shoe, an anchor pivot on which said shoe is mounted and which is arranged adjacent said other end of the arcuate member, said arcuate member being arranged beside the web, and having engagement between its ends with the web.

17. A brake comprising, in combination, a drum, a pair of brake shoes arranged end to end and engageable with the drum, a web on one of said shoes extending radially inward, a member beside the web and having operative engagement with the web, said member being anchored at one end to a stationary part of the brake, and a thrust link connecting the unanchored end of said member to the other shoe.

18. A brake comprising, in combination, a drum, a pair of brake shoes arranged end to end and engageable with the drum, a web on one of said shoes extending radially inward, a member beside the web and having operative engagement with the web, said member being anchored at one end to a stationary part of the brake, and an adjustable thrust device pivotally connecting the unanchored end of said member to the other shoe.

19. A brake comprising, in combination, a drum, a pair of shoes, an anchor for the end of one of said shoes, means acting on said shoes to force them against the drum, a thrust member beside and acting on the anchored shoe and which is anchored at one end, and a link frictionally pivoted to the unanchored shoe and pivoted to the unanchored end of the thrust member.

20. A brake comprising a drum, a pair of substantially semi-circular brake shoes one of which is anchored at one end, applying means acting on the other end of the anchored shoe and on the unanchored shoe directly across the drum from the anchored end of said one shoe, and auxiliary applying means frictionally pivoted to the unanchored shoe and acting on the anchored shoe between its ends.

21. A brake comprising a drum, a pair of substantially semi-circular brake shoes one of which is anchored at one end, applying means acting on the other end of the anchored shoe and on the unanchored shoe directly across the drum from the anchored end of said one shoe, and auxiliary applying means including a link frictionally pivoted to the end of the unanchored shoe and which means acts on the anchored shoe between its ends.

LUDGER E. LA BRIE.